United States Patent
Hasegawa

(10) Patent No.: US 9,846,293 B2
(45) Date of Patent: Dec. 19, 2017

(54) LENS BARREL, OPTICAL APPARATUS, AND METHOD OF MANUFACTURING THE LENS BARREL

(71) Applicant: CANON KABUSHIKI KAISHA, Tokyo (JP)

(72) Inventor: Tomoki Hasegawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 14/835,188

(22) Filed: Aug. 25, 2015

(65) Prior Publication Data

US 2016/0062071 A1 Mar. 3, 2016

(30) Foreign Application Priority Data

Aug. 29, 2014 (JP) .................................. 2014-174798

(51) Int. Cl.
| | |
|---|---|
| *G02B 7/02* | (2006.01) |
| *G03B 43/00* | (2006.01) |
| *G03B 17/12* | (2006.01) |
| *G02B 5/00* | (2006.01) |

(52) U.S. Cl.
CPC ............. *G02B 7/023* (2013.01); *G02B 7/021* (2013.01); *G02B 7/025* (2013.01); *G03B 17/12* (2013.01); *G03B 43/00* (2013.01); *G02B 5/005* (2013.01)

(58) Field of Classification Search
CPC ................................ G02B 7/023; G02B 7/025
USPC ........................................ 359/694, 822, 826
See application file for complete search history.

(56) References Cited

U.S. PATENT DOCUMENTS 6,724,541 B2 * 4/2004 Noguchi ................ G02B 7/102
 359/700
7,327,527 B2 * 2/2008 Sakamoto ................ G02B 7/10
 359/700

FOREIGN PATENT DOCUMENTS

| JP | 11174301 A | 7/1999 |
|---|---|---|
| JP | 4732714 B2 | 7/2011 |

* cited by examiner

*Primary Examiner* — Zachary Wilkes
(74) *Attorney, Agent, or Firm* — Rossi, Kimms & McDowell LLP

(57) ABSTRACT

A lens barrel includes a first lens holder 1, a second lens holder 2, a third lens holder 3, and elastically deformers 3*a*, 3*b*, and 3*c* integrally formed on the third lens holder to apply elastic forces on the second lens holder in an optical-axis direction. The second lens holder is arranged between the first lens holder and the third lens holder. The position of the second lens holder is adjustable in the direction orthogonal to an optical axis before the second lens holder is bonded.

15 Claims, 10 Drawing Sheets

LENS BARREL, OPTICAL APPARATUS, AND METHOD OF MANUFACTURING THE LENS BARREL

BACKGROUND OF THE INVENTION

Field of the Invention

The present invention relates to a lens barrel, an optical apparatus, and a method of manufacturing the lens barrel.

Description of the Related Art

Conventionally, a mechanism for adjusting the position of an optical element, such as a lens included in an optical system, in a direction orthogonal to an optical axis of the optical system has been developed to prevent an optical performance degradation caused when the optical element is decentered off the optical axis due to, for example, manufacturing error. A recent increasing sensitivity of the decentering of a lens unit due to, for example, downsizing of the optical system requires a higher accuracy of the adjustment.

Japanese Patent No. 4,732,714 discloses an optical apparatus in which an optical element is pressed in the direction of an optical axis (optical-axis direction) by a tool, and the position of the optical element is adjusted in a direction orthogonal to the optical axis while the tool is prevented from moving away from the optical element until the optical element is bonded. Japanese Patent Laid-open No. 11-174301 discloses a lens apparatus in which part of a lens holder is exposed outside a lens barrel, and an adjusting force applied to this exposed part from outside the lens barrel adjusts the position of the lens holder in a direction orthogonal to the optical axis.

In the disclosure of Japanese Patent No. 4,732,714, the tool is provided with a presser for pressing the optical element in the optical-axis direction, which complicates the structure of the tool. Moreover, since the invention disclosed in Japanese Patent No. 4,732,714 relates to an adjustment method of a single lens unit, which is not applicable to an adjustment in combination with other barrel components, the lens unit is likely to suffer the decentering when combined with other lens units. In the invention disclosed in Japanese Patent Laid-open No. 11-174301, although a lens unit is adjusted in combination with other barrel components, the lens unit is held by a holding force due to sandwiching, not by any fixer, after the adjustment. The position of the lens unit is likely to be shifted when an external force greater than the holding force is applied to the lens unit.

SUMMARY OF THE INVENTION

The present invention provides a lens barrel that includes a plurality of barrel components, at least one of the barrel components holding a lens unit, and is capable of highly accurately adjusting the position of the lens unit in a direction orthogonal to an optical axis, and an optical apparatus including the lens barrel, and a method of manufacturing the lens barrel.

A lens barrel as an aspect of the present invention includes a first barrel component, a second barrel component configured to hold a lens unit, a third barrel component configured to hold a lens unit, and an elasticity integrally formed on the second barrel component or the third barrel component and deformable to apply an elastic force on the second barrel component in an optical-axis direction of the lens unit. The second barrel component is disposed between the first barrel component and the third barrel component and bonded to one of the first barrel component and the third barrel component. A position of the second barrel component is adjustable in a direction orthogonal to an optical axis of the lens unit before the second barrel component is bonded.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
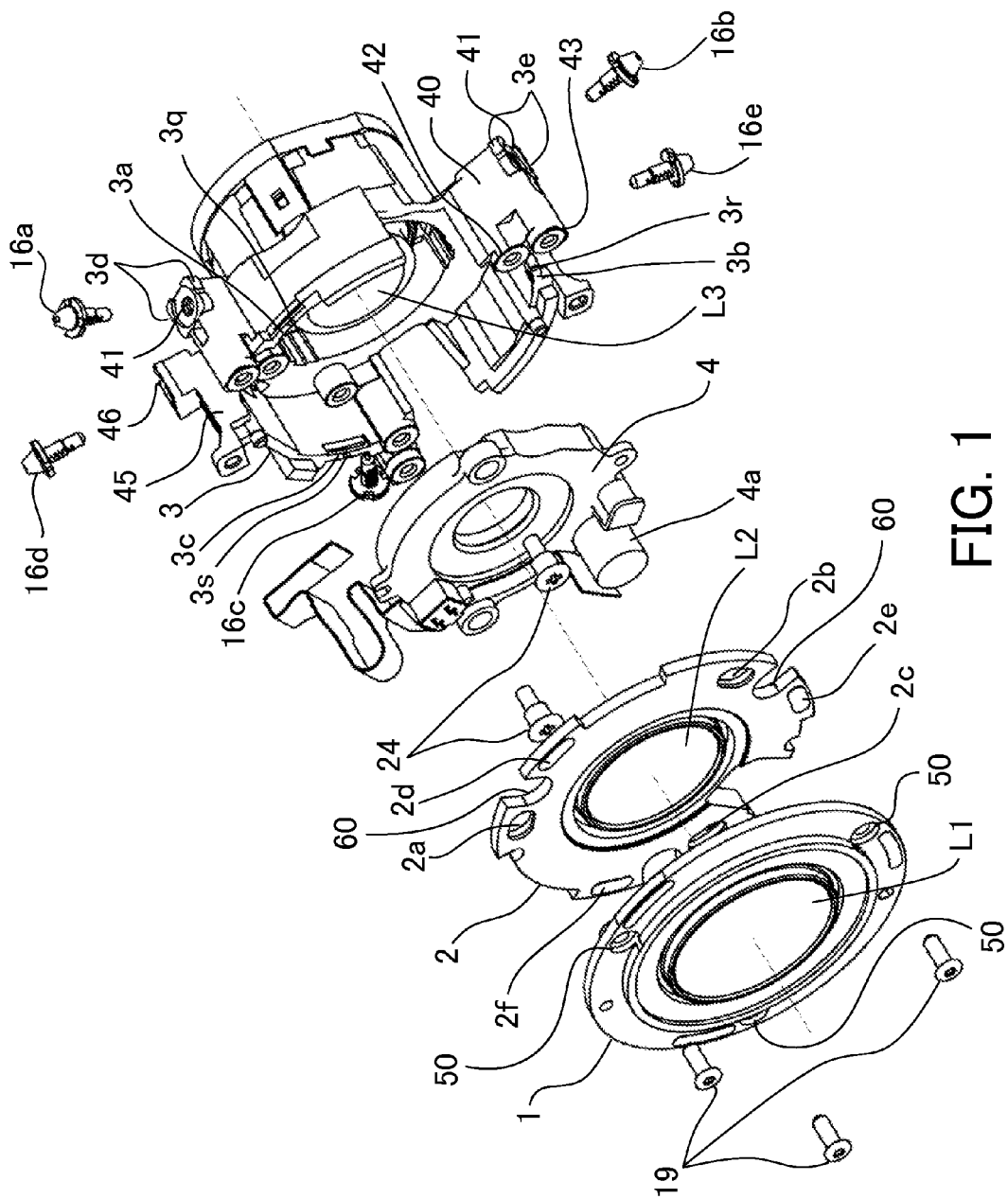
FIG. 1 is an exploded perspective view of a main part of a lens barrel according to Embodiment 1 of the present invention when viewed from a front side.
Figure 2:
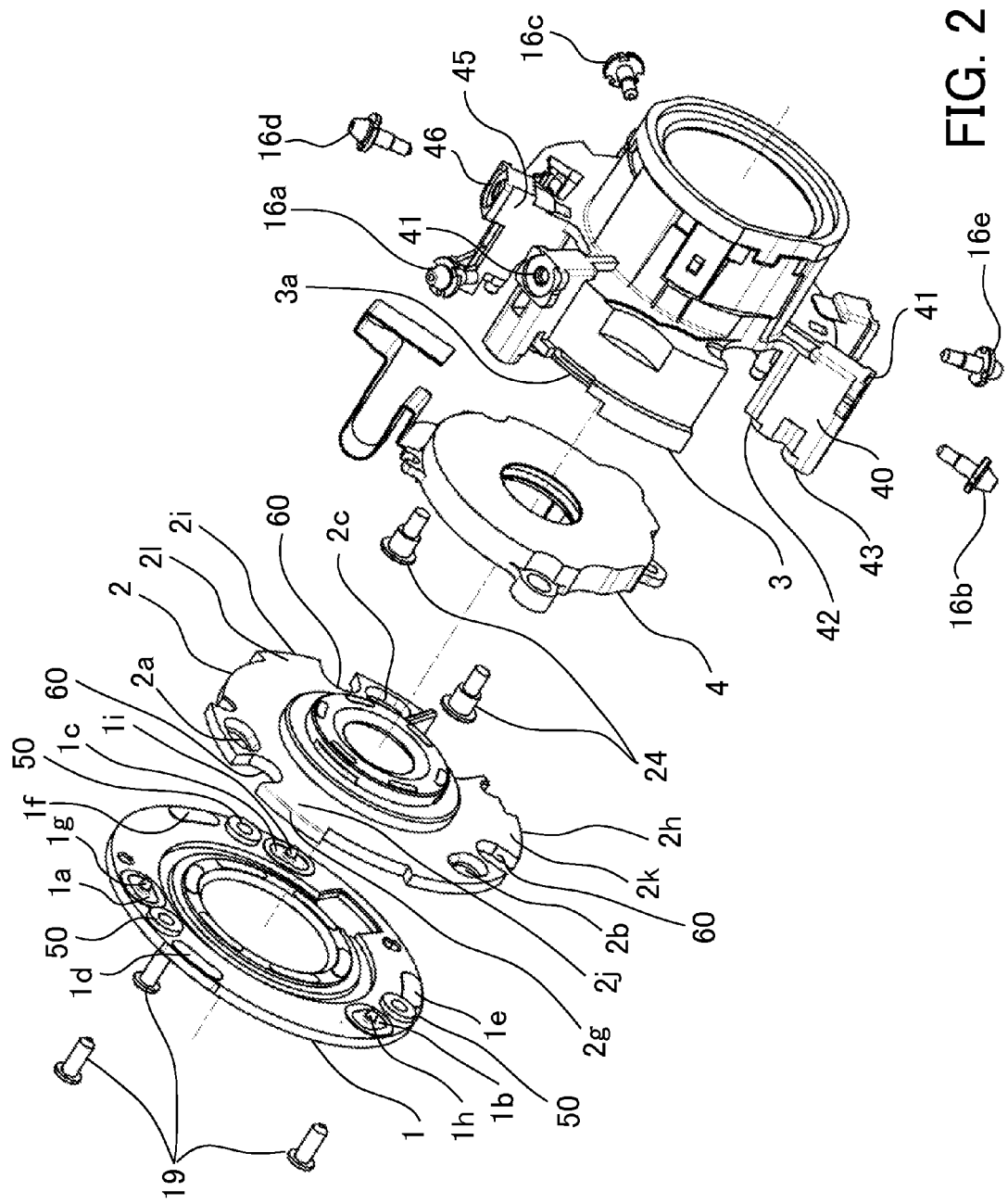
FIG. 2 is an exploded perspective view of the main part of the lens barrel illustrated in FIG. 1 when viewed from a back side according to Embodiment 1.
Figure 3:
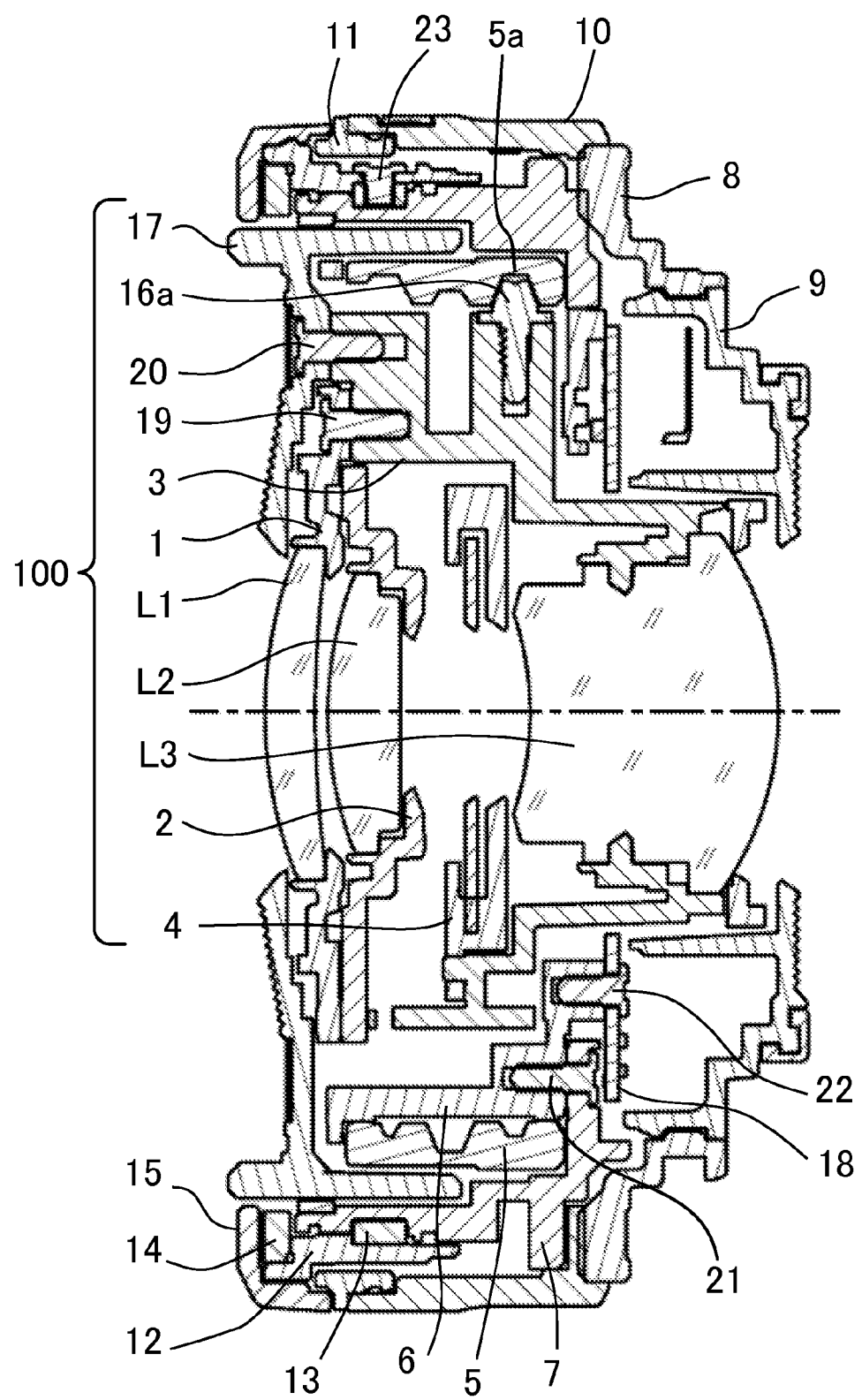
FIG. 3 is a sectional view of the lens barrel including the main part illustrated in FIG. 1 according to Embodiment 1.
Figure 4:
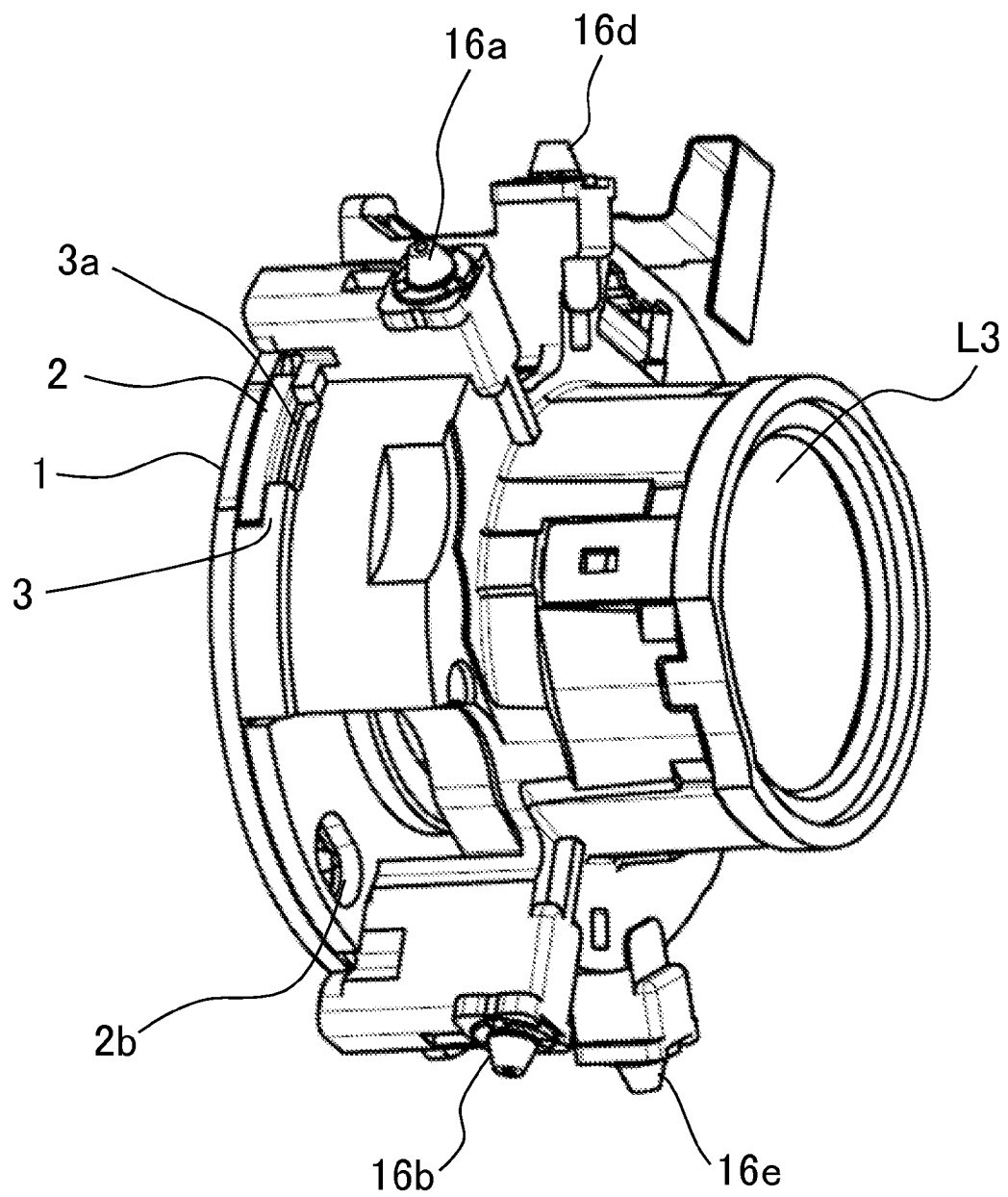
FIG. 4 is a perspective diagram of the main part illustrated in FIG. 1 according to Embodiment 1.

FIG. 1 is a partially exploded perspective view of a main part of a lens barrel according to Embodiment 1 of the present invention when viewed from a front side (object side). FIG. 2 is a partially exploded perspective view of the main part of the lens barrel when viewed from a back side (image side). Dashed and single-dotted lines in FIGS. 1 and 2 represent an optical axis. FIG. 3 is a partially sectional view of the lens barrel in Embodiment 1, and a dashed and single-dotted line in FIG. 3 represents the optical axis. FIG. 4 is a perspective diagram of the main part in Embodiment 1 in an assembled state.

The lens barrel in this embodiment is used as a camera system (optical apparatus) when attached interchangeably to a nonillustrated camera body (image capturing apparatus body). The lens barrel includes an image pickup optical system that forms an object image. The image pickup optical system includes a focus lens that is movable in the direction of the optical axis (optical-axis direction) for focusing. An image sensor photoelectrically converts the object image formed by the image pickup optical system. The present invention is applicable to an optical apparatus, such as a camera and a projector, including a lens barrel.

As illustrated in FIG. 3, reference numeral 8 denotes a mount for attaching the lens barrel to the camera body (not illustrated). The mount 8 is fixed to a back cover 9 by an elastic force exerted by a click integrally formed on the back cover 9. Reference numeral 7 denotes a fixed barrel to which the mount 8 is fixed by a screw not illustrated. Reference numeral 6 denotes a guide barrel disposed on the inner periphery of the fixed barrel 7 and fixed to the fixed barrel 7 by three screws 21. The guide barrel 6 is provided with three straight grooves not illustrated.

Reference numeral 5 denotes a cam ring disposed rotatably at a fixed position in the optical-axis direction between an outer periphery of the guide barrel 6 and the inner periphery of the fixed barrel 7. Three cam grooves 5a and two sub cam grooves (not illustrated) having groove widths different from those of the cam grooves 5a are formed on the inner periphery of the cam ring 5 and each have a tapering surface.

As illustrated in FIGS. 1 to 4, reference numeral L1 denotes a first lens unit, reference numeral L2 denotes a second lens unit, and reference numeral L3 denotes a third lens unit. Reference numeral 1 denotes a first lens holder (first barrel component) configured to hold the first lens unit L1, reference numeral 2 denotes a second lens holder (second barrel component) configured to hold the second lens unit L2, and reference numeral 3 denotes a third lens holder (third barrel component) configured to hold the third lens unit L3. Alternatively, the first lens holder may not hold the first lens unit L1, or the third lens holder may not hold the third lens unit L3. FIGS. 1, 2, and 4 illustrate the first lens holder 1, the second lens holder 2, and the third lens holder 3 among components illustrated in FIG. 3.

The second lens holder 2 is held movable between the first lens holder 1 and the third lens holder 3 in the direction orthogonal to the optical axis of the image pickup optical system, and is bonded after optical centering. Detailed structure and configuration will be described later.

Reference numeral 4 denotes a diaphragm unit fixed to the third lens holder 3 by two screws 24. Changing the area of an opening formed by built-in aperture blades adjusts a light quantity.

As illustrated in FIG. 1, the lens barrel includes, along the optical axis in order closest to the object side, the first lens holder 1, the second lens holder 2, the diaphragm unit 4, and the third lens holder 3. The first lens unit L1, the second lens unit L2, the third lens unit L3, and the diaphragm unit 4 are included in a movable lens unit 100 as the image pickup optical system integrally movable in the optical-axis direction.

The third lens holder 3 is provided with holding parts 40 at three positions on its outer periphery in the circumferential direction, and each holding part 40 is provided with a screw hole 41. The screw holes 41 are engaged with screw parts of three cam followers 16a, 16b, and 16c, and each extend in the radial direction from the optical axis on a plane orthogonal to the optical axis. This configuration fixes the three cam followers 16a, 16b, and 16c to the third lens holder 3. The three cam followers 16a, 16b, and 16c each have a circular truncated cone part, and are respectively engaged with the three cam grooves 5a formed on the cam ring 5 as illustrated in FIG. 3.

Each holding part 40 is provided with, on its inner periphery, a screw hole 42 that is engaged with a screw 19, and is provided with, on its outer periphery, a screw hole 43 that is engaged with a screw 20. The screw hole 43 is higher than the screw hole 42. The screw holes 42 and 43 each extend in the optical-axis direction.

The third lens holder 3 is provided with holding parts 45 at two positions on its outer periphery in the circumferential direction, and each holding part 45 is provided with a screw hole 46. The screw holes 46 are engaged with screw parts of two cam followers 16d and 16e, and each extend in the radial direction from the optical axis along the plane orthogonal to the optical axis. This configuration fixes the two cam followers 16d and 16e to the third lens holder 3. The two cam followers 16d and 16e each have a circular truncated cone shape, and are respectively inserted into the two sub cam grooves (not illustrated) formed on the cam ring 5. The two cam followers 16d and 16e are not in contact with cam surfaces of the two sub cam grooves in a normal state, and are made contact with the cam surfaces when they receive an external impact, thereby preventing the three cam followers 16a, 16b, and 16c from dropping off the cam grooves 5a engaged with the cam followers 16a, 16b, and 16c.

Key parts 3d, 3e, and 3f are formed on both sides of the screw hole 41 of the holding part 40 of the third lens holder 3 in the circumferential direction, and engaged with three straight groove parts (not illustrated) formed on the guide barrel 6. Thus, the third lens holder 3 is guided by the straight groove parts to move straight in the optical-axis direction.

When the cam ring 5 is rotated in the circumferential direction, a cam lift by the cam grooves 5a moves the cam followers 16a, 16b, and 16c in the optical-axis direction, and thus the third lens holder 3 is moved straight in the optical-axis direction, being guided by the straight groove parts. In other words, the movable lens unit 100 is moved in the optical-axis direction. A focusing operation is performed between an infinite end and a close end by moving the movable lens unit 100 in the optical-axis direction in accordance with an object distance.

Reference numeral 12 denotes a fixed-position rotation ring whose inner periphery is engaged with the outer periphery of the fixed barrel 7. A C-shaped metal key 13 is fixed to the inner periphery of the fixed-position rotation ring 12 by a screw 23. The key 13 is engaged with a circumferential groove portion formed on the outer periphery of the fixed barrel 7. This configuration holds the fixed-position rotation ring rotatable in the circumferential direction at a fixed position in the optical-axis direction.

Reference numeral 15 denotes a focusing ring fixed to the outer periphery of the fixed-position rotation ring 12 and rotatable at a fixed position. Reference numeral 14 denotes a metal reinforcing ring held between the fixed-position rotation ring 12 and the focusing ring 15, and fixed through bonding.

Reference numeral 17 denotes a filter frame fixed to the third lens holder 3 by the three screws 20. The filter frame 17 is provided with a screw part that is formed at its head and on which accessories such as an optical filter and a hood can be mounted.

Reference numeral 10 denotes an exterior ring fixed together with the mount 8 to the fixed barrel 7 by a screw (not illustrated). A metal reinforcing ring 11 is fixed at a front end of the exterior ring 10. A motor unit (not illustrated) including a motor and a gearbox is fixed to the fixed barrel 7 by a screw. An output gear of the motor unit is meshed with an inner gear (not illustrated) provided to the inner periphery of the cam ring 5. Thus, as the motor rotates, the cam ring is rotated and the movable lens unit 100 moves in the optical-axis direction.

A brush (not illustrated) is fixed to the cam ring 5 by a screw. The brush is slidable on a gray code pattern of an encoder flexible substrate (not illustrated) fixed to the guide barrel 6, and is used to detect a positional relationship between the cam ring 5 and the encoder flexible substrate.

Reference numeral 18 denotes a substrate to which electronic components are mounted and that is fixed to the fixed barrel 7 by a screw 22. The substrate 18 is electrically connected with, for example, the diaphragm unit 4, the motor unit, the encoder flexible substrate, an AF/MF switch (not illustrated), and a sensor (not illustrated) for detecting the rotational amount of the focusing ring 15, through a flexible printed board. A micro computer mounted on the substrate 18 performs various drive controls of the diaphragm unit 4 and the motor unit (not illustrated). The micro computer serves as a lens controller for controlling each component in the lens barrel.

The substrate 18 is connected, through the flexible printed board, with a contact block (not illustrated) fixed to the mount 8 by a screw for communication with the camera body and power supply therefrom.

Next follows a detailed description of the configuration of the movable lens unit 100, especially of a centering mechanism of the second lens unit L2 and a structure for fixing the adjusted position.

To prevent an optical performance degradation due to, for example, manufacturing errors, the position of the second lens unit L2 is adjustable in the direction orthogonal to the optical axis before the second lens holder 2 is bonded to the first lens holder 1. The second lens holder 2 may be disposed between the first lens holder 1 and the third lens holder 3, bonded to one of the first lens holder 1 and the third lens holder 3, and adjustable in position in the direction orthogonal to the optical axis of the lens unit before the second lens holder 2 is bonded.

In FIGS. 1 and 2, the first lens holder 1 is fixed to the third lens holder 3 by the three screws 19. The screw 19 is fixed to the screw hole 42 through a hole 50 provided to the first lens holder 1 illustrated in FIGS. 1 and 2 and through a cutout 60 provided to the second lens holder 2.

The holes 50 are provided between an adhesive agent receiver 1a and a contact portion 1d for contact with the second lens holder 2, between an adhesive agent receiver 1b and a contact portion 1e for contact with the second lens holder 2, and between an adhesive agent receiver 1c and a contact portion 1f for contact with the second lens holder 2, in the circumferential direction.

The cutouts 60 are provided between an adhesive agent filling hole 2a and a contact portion 2d for contact with the first lens holder 1, between an adhesive agent filling hole 2b and a contact portion 2e for contact with the first lens holder 1, and between an adhesive agent filling hole 2c and a contact portion 2f for contact with the first lens holder 1, in the circumferential direction. Adhesive agent 70 is applied (or filled) in the adhesive agent filling holes 2a, 2b, and 2c. There is a gap between the screw 19 and the cutout 60, which allows the second lens holder 2 being held between the first lens holder 1 and the third lens holder 3 to be adjusted to some extent in position in the direction orthogonal to the optical axis before the second lens holder 2 is bonded.

The third lens holder 3 is provided, on its wall, with elongate holes extending in the circumferential direction to form thin parts and integrally form three elastically deformers 3a, 3b, and 3c that are elastically deformable in the optical-axis direction. The elastically deformers 3a, 3b, and 3c serve as elastic members that apply an elastic force due to deformation to the second lens holder 2 in the optical-axis direction. The integral formation contributes to reductions in the number of components and cost. The elastically deformers 3a, 3b, and 3c are provided with hemispherical protrusions 3q, 3r, and 3s, respectively, for contact with the second lens holder 2.

The screw 19 and the screw hole 42 serve as a fixer for fixing the first lens holder 1 and the third lens holder 3 to each other so that the position of the second lens holder 2 is adjustable in the direction orthogonal to the optical axis and elastic forces by the elastically deformers 3a, 3b, and 3c are applied to the second lens holder 2.

Japanese Patent No. 4,732,714 discloses a tool provided with a presser, which complicates the structure of the tool, making designing and manufacturing difficult. In this embodiment, the presser is integrally formed on the third lens holder 3. Although a typical tool is not manufactured by injection molding, the formation of the elastically deformers 3a, 3b, and 3c on the third lens holder 3 only requires changing the shape of a mold for shaping the third lens holder 3, and thus its manufacturing is not difficult. This also simplifies the structure of a tool described later, thereby facilitating the position adjustment and maintaining the accuracy thereof.

Figure 5:
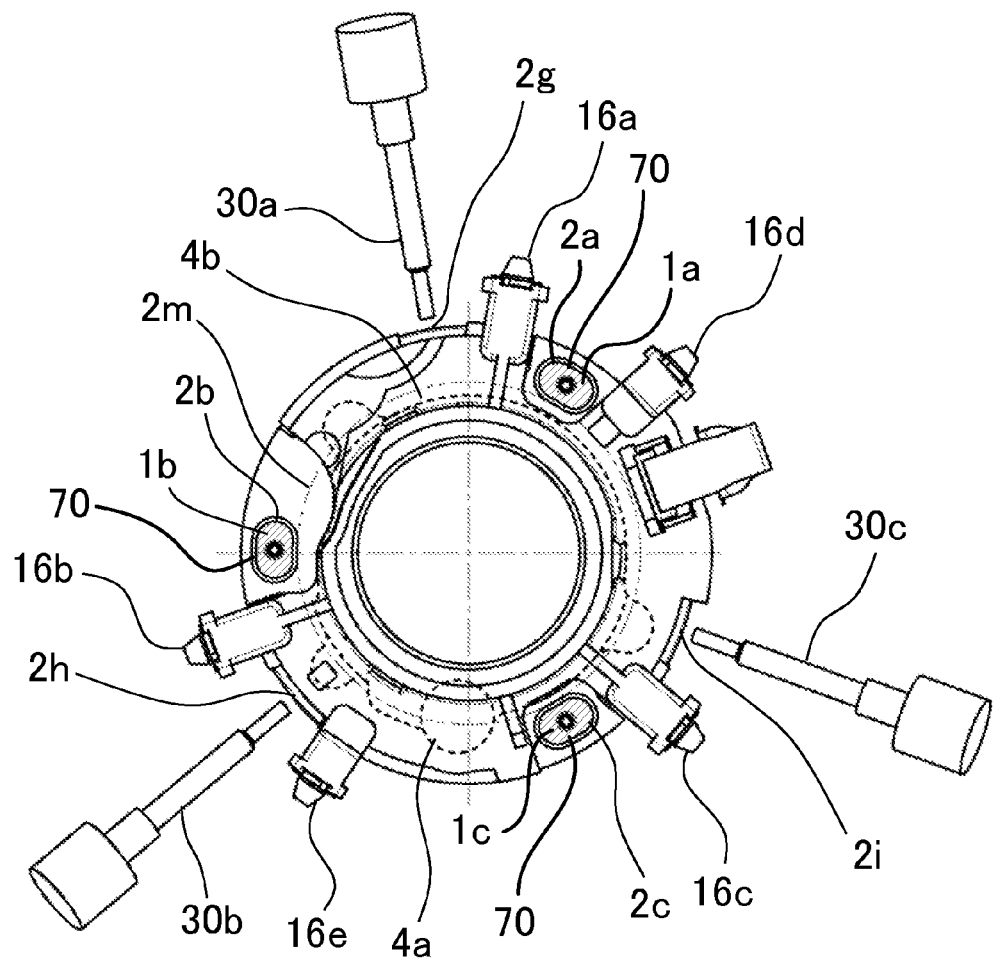
FIG. 5 is a partially transparent back view of the main part illustrated in FIG. 1 in an assembled state according to Embodiment 1.
Figure 6:
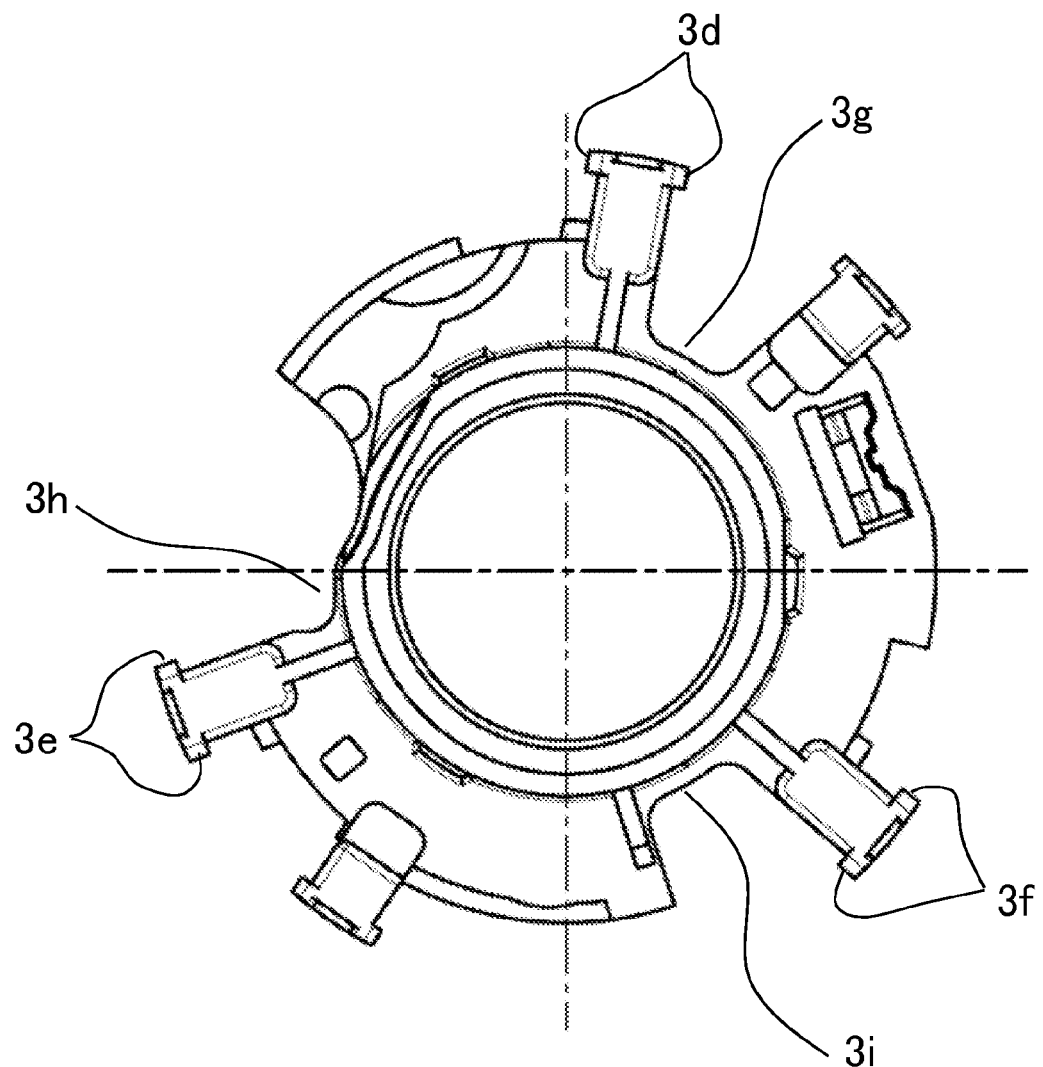
FIG. 6 is a back view of a third lens holder illustrated in FIG. 1 according to Embodiment 1.

FIG. 5 is a back view of the main part illustrated in FIG. 1 in the assembled state. FIG. 6 is a back view of the third lens holder 3. Reference numerals 3g, 3h, and 3i illustrated in FIG. 6 denote cutouts for exposing the adhesive agent filling holes (through-holes) 2a, 2b, and 2c illustrated in FIG. 5 when the main part is viewed from the back side in the assembled state.

The second lens holder 2 is provided with contact portions 2j, 2k, and 2l for contact with the third lens holder 3 at three points, and the contact portions 2j, 2k, and 2l are made contact with the hemispherical protrusions 3q, 3r, and 3s of the elastically deformers 3a, 3b, and 3c. Tool contact portions 2g, 2h, and 2i with which tool pins 30a, 30b, and 30c for the centering are made contact from outside are provided at three points on the outer periphery of the second lens holder 2. The tool contact portion 2g is provided on a part of the outer periphery corresponding to the contact portion 2j, and the contact portion 2d for contact with the first lens holder 1 is provided on a plane opposite to the contact portion 2j. The tool contact portion 2h is provided on a part of the outer periphery corresponding to the contact portion 2k, and the contact portion 2e for contact with the first lens holder 1 is provided on a plane opposite to the contact portion 2k. The tool contact portion 2i is provided on a part of the outer periphery corresponding to the contact portion 2l, and the contact portion 2f for contact with the first lens holder 1 is provided on a part opposite to the contact portion 2l. The contact portions 1d, 1e, and 1f of the first lens holder 1 for contact with the second lens holder 2 at three points are respectively in contact with the contact portions 2d, 2e, and 2f of the second lens holder 2.

In this manner, when the second lens holder 2 is projected onto the plane orthogonal to the optical axis, the elastically deformers apply elastic forces in angle ranges of the tool contact portions 2g, 2h, and 2i around the optical axis as the center, in which the second lens holder 2 contacts the tool pins. The adhesive agent filling holes 2a, 2b, and 2c and the adhesive agent receivers 1a, 1b, and 1c are provided outside the angle ranges of the tool contact portions 2g, 2h, and 2i around the optical axis as the center, when the second lens holder 2 is projected onto the plane orthogonal to the optical axis.

While the adhesive agent filling holes 2a, 2b, and 2c of the second lens holder 2 and the adhesive agent receivers 1a, 1b, and 1c of the first lens holder 1 are aligned with each other as illustrated in FIG. 5, the adhesive agent 70 is filled as hatched. The adhesive agent receivers 1a, 1b, and 1c receive the adhesive agent 70 applied (or filled) in the adhesive agent filling holes 2a, 2b, and 2c. The adhesive agent receivers 1a, 1b, and 1c are provided with pinlike protrusions 1g, 1h, and 1i. Each pinlike protrusion has a substantially circular-cone shape with a pin at its apex. The pinlike protrusions 1g, 1h, and 1i provide extended bonding areas for contact with the adhesive agent. When cured, the adhesive agent 70 bonds the adhesive agent receivers 1a, 1b, and 1c with the inner surfaces of the adhesive agent filling holes 2a, 2b, and 2c and thereby the second lens holder 2 to the first lens holder 1.

Alternatively, the second lens holder 2 may be bonded to the third lens holder 3. In this case, the second lens holder 2 may have through-holes in which the adhesive agent is applied, and one of the first lens holder 1 and the third lens holder 3 may have receivers that receive the adhesive agent applied in the through-holes.

In the assembled state, the hemispherical protrusions 3q, 3r, and 3s of the elastically deformers 3a, 3b, and 3c are elasticity deformed and contact the contact portions 2j, 2k, and 2l of the second lens holder 2 for contact with the third lens holder 3. Accordingly, the second lens holder 2 is constantly pressed against the first lens holder 1 by reaction forces applied by the elastically deformers 3a, 3b, and 3c, and is held movable in the direction orthogonal to the optical axis. Before the centering, the reaction forces prevent, for example, a positional shift, backlash, and fall of the second lens holder 2, thereby stably holding the second lens holder 2 between the first lens holder 1 and the third lens holder 3. This maintains the accuracy of the position adjustment of the lens unit L2.

In FIG. 5, the tool contact portions 2g, 2h, and 2i at the three points are provided at substantially the same angle phases as those of the elastically deformers 3a, 3b, and 3c, respectively. Specifically, the elastically deformer 3a is in contact with the contact portion 2j in an angle range that is made by connecting a center as the optical axis to both ends of the tool contact portion 2g in the circumferential direction. Similarly, the elastically deformer 3b is in contact with the contact portion 2k in an angle range that is made by connecting a center as the optical axis to both ends of the tool contact portion 2h in the circumferential direction. Similarly, the elastically deformer 3c is in contact with the contact portion 2l in an angle range that is made by connecting a center as the optical axis to both ends of the tool contact portion 2i in the circumferential direction. The elastically deformers 3a, 3b, and 3c press, in the optical-axis direction, vicinities where the tool pins 30a, 30b, and 30c apply forces, and prevent the second lens holder 2 from moving in the optical-axis direction by the forces applied by the tool pins 30a, 30b, and 30c.

The cam followers 16a, 16b, and 16c are disposed between the tool contact portions 2g, 2h, and 2i and the adhesive agent filling holes 2a, 2b, and 2c.

The adhesive agent filling holes 2a, 2b, and 2c and the adhesive agent receivers 1a, 1b, and 1c are provided in angle phases different from those of the tool contact portions 2g, 2h, and 2i and the elastically deformers 3a, 3b, and 3c. Specifically, as illustrated in FIG. 5, the adhesive agent filling hole 2a and the adhesive agent receiver 1a are disposed outside the angle range (first angle range) made by connecting the optical axis to both ends of the tool contact portion 2g in the circumferential direction. The adhesive agent filling hole 2b and the adhesive agent receiver 1b are disposed outside the angle range (second angle range) made by connecting the optical axis to both ends of the tool contact portion 2h in the circumferential direction. The adhesive agent filling hole 2c and the adhesive agent receiver 1c are disposed outside the angle range (third angle range) made by connecting the optical axis to both ends of the tool contact portion 2i in the circumferential direction.

Since the tool pins 30a, 30b, and 30c do not interfere with an adhesive dispenser, the adhesive agent filling holes 2a, 2b, and 2c can be filled with the adhesive agent after the centering, while the tool pins 30a, 30b, and 30c are kept in contact with the second lens holder 2.

A motor 4a as a driving source of the diaphragm unit 4, which is illustrated with a dashed line, is disposed in an angle phase different from that of each of the adhesive agent filling holes 2a, 2b, and 2c and the adhesive agent receivers 1a, 1b, and 1c, the tool contact portions 2g, 2h, and 2i and the elastically deformers 3a, 3b, and 3c. Specifically, as illustrated in FIG. 5, the motor 4a is not disposed in (is disposed outside) the first angle range, the second angle range, and the third angle range. The motor 4a is also not disposed in an angle range made by connecting the optical axis to both ends of each adhesive agent filling hole in the circumferential direction. If the motor 4a is disposed in the same angle phase as that of each of the elastically deformers and adhesive agent filling parts including the adhesive agent filling holes and the adhesive agent receivers, it is necessary to dispose the elastically deformers and the adhesive agent filling parts outside the motor 4a, which leads to an increase in size. Disposing the motor 4a in the angle phase different from that of each of the elastically deformers and the adhesive agent filling parts can maintain the size small in the radial direction.

FIG. 5 illustrates the main part projected onto the plane orthogonal to the optical axis. FIG. 5 illustrates, with a dashed and double-dotted line, a circle 2m that has a center at the optical axis O and a radius of a line segment from the optical axis O to each of the parts of the adhesive agent filling holes 2a, 2b, and 2c closest to the optical axis. A circle 4b illustrating the outline of the diaphragm unit 4 illustrated with a dashed line is located inside the circle 2m, and thus the diaphragm unit 4 is provided inside the circle 2m. Since the diaphragm unit 4 does not interfere with parts where the adhesive agent is applied, the bonding step can be performed while the diaphragm unit 4 is assembled.

The adhesive agent filling holes 2a, 2b, and 2c are provided at positions to avoid interference with the tool contact portions 2g, 2h, and 2i, the motor (actuator) 4a for driving a diaphragm of the diaphragm unit 4, and the outline 4b, when viewed from the back side. In other words, in FIG. 5, the motor 4a is provided outside the angle ranges of the tool contact portions 2g, 2h, and 2i, each of which has a center at the optical axis O. Thus, the position adjustment step of the second lens holder 2 and the bonding step of it can be performed while the motor 4a is assembled in the lens barrel. In other words, since the motor 4a is included in the diaphragm unit 4 (diaphragm), the bonding step of the second lens holder 2 can be performed while the diaphragm unit 4 is assembled in the lens barrel.

In a manufacturing method (centering method) of the lens barrel, the diaphragm unit 4, the second lens holder 2, and the first lens holder 1 are incorporated and integrated into the third lens holder 3. Specifically, there is a step of fixing the first lens holder 1 and the third lens holder 3 to each other with the second lens holder 2 held therebetween so that the position of the second lens holder 2 is adjustable in the direction orthogonal to the optical axis and the elastic forces by the elastically deformers 3a, 3b, and 3c are applied to the second lens holder 2. This fixation is achieved by fixing the screw 19 and the screw hole 42 to each other. Next, the lens barrel is placed with the first lens unit L1 located at the bottom.

Next follows a step of bringing the tool pins 30a, 30b, and 30c into contact with the tool contact portions 2g, 2h, and 2i of the second lens holder 2 from the outside to adjust the position of the second lens holder 2 in the direction orthogonal to the optical axis through the tool pins. The alignment may be performed by using the adhesive agent filling holes, and the adhesive agent receivers or a positioning mark (not illustrated).

A spring (not illustrated) applies a force constantly toward the optical axis (in the radial direction in FIG. 5) at one of the tool pins 30a, 30b, and 30c. Moving the other two tool pins in a direction toward the optical axis and a direction opposite thereto can adjust the position of the second lens holder 2 in the plane orthogonal to the optical axis.

The tool contact portions 2g, 2h, and 2i of the second lens holder 2 for contact with the tool pins 30a, 30b, and 30c are provided in substantially the same angle phases as those of the elastically deformers 3a, 3b, and 3c of the third lens holder 3, and are disposed near the elastically deformers 3a, 3b, and 3c. In other words, in FIG. 5, the elastically deformers 3a, 3b, and 3c apply the elastic forces in the angle ranges of the tool contact portions 2g, 2h, and 2i around the optical axis O as the center. In this manner, the second lens holder 2 is prevented from moving in the position adjustment using the tool pins 30a, 30b, and 30c, and an improved accuracy of the centering is achieved. The tool pins 30a, 30b, and 30c do not necessarily have means for pressing the second lens holder 2 in the optical-axis direction, thereby achieving a simpler tool configuration than that disclosed in Japanese Patent No. 4,732,714.

When the adjustment by the tool pins 30a, 30b, and 30c is completed, the adhesive agent 70 is filled from the back side into the adhesive agent filling parts including the adhesive agent filling holes 2a, 2b, and 2c and the adhesive agent receivers 1a, 1b, and 1c, while the tool pins 30a, 30b, and 30c are in contact with the second lens holder 2.

In FIG. 5, since the adhesive agent filling holes 2a, 2b, and 2c are provided outside the angle ranges around the optical axis O as the center, of the tool contact portions 2g, 2h, and 2i, the adhesive agent 70 can be applied while the tool pins 30a, 30b, and 30c are in contact with the second lens holder 2.

The adhesive agent 70 is ultraviolet curable resin in this embodiment, but is not limited thereto and may be other kinds of adhesive agents. The adhesive agent is filled by its own weight, and is received by the adhesive agent receivers orthogonal to the direction of gravitational force, which prevents the adhesive agent from flowing out of the adhesive agent filling holes.

After the adhesive agent is filled, the adhesive agent is irradiated with ultraviolet light from the back side to be cured. This reliably fixes the second lens holder 2 to the first lens holder 1. After the adhesive agent is cured, the tool pins 30a, 30b, and 30c are removed. The second lens holder 2 is fixed by bonding after the tool pins 30a, 30b, and 30c are removed, and its adjusted state is maintained even when an external force etc. is applied.

In Japanese Patent Laid-open No. 11-174301, the position of a target component is adjusted in a direction orthogonal to an optical axis while the target component is being sandwiched between two fixing members, but the adjusted position is not fixed. Thus, in Japanese Patent Laid-open No. 11-174301, when an external force is applied to an exposed part or an impact force greater than the holding force of the sandwiching is applied to the lens barrel, the adjusted state may adversely change. This embodiment avoids this adverse change.

After the centering and the adhesive agent curing, the elastically deformers 3a, 3b, and 3c still constantly press the second lens holder 2 in the optical-axis direction toward the first lens holder 1. Thus, even when receiving, for example, a strong impact enough to strip the adhesive agent, the second lens holder 2 is prevented from moving.

When this pressed state is changed between the adjustment and the bonding, an adjustment position may shift and lead to an optical performance degradation. This problem does not happen with this embodiment because a force is constantly applied to the second lens holder 2 from the centering until the adhesive agent curing.

Embodiment 2

Figure 7:
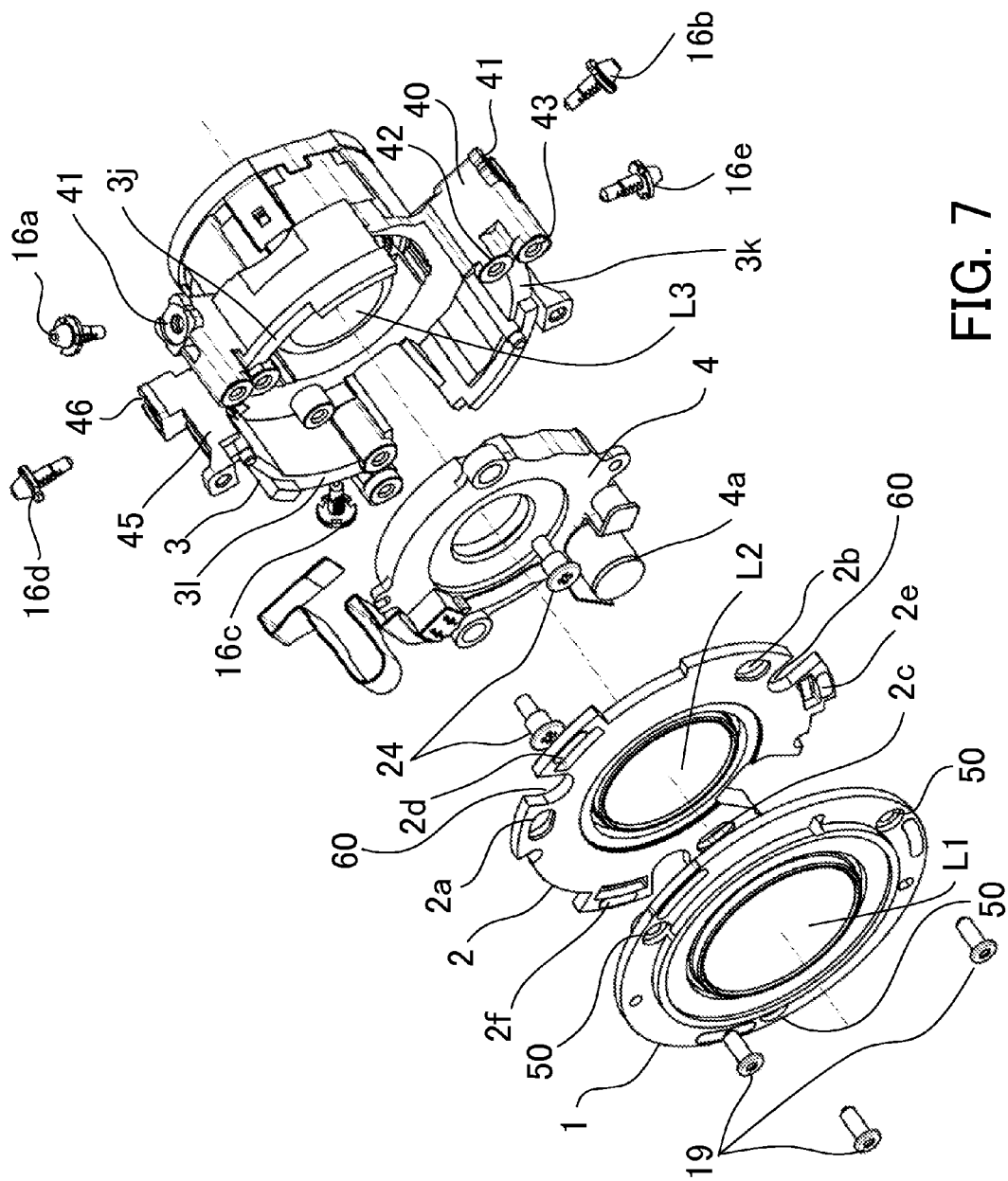
FIG. 7 is an exploded perspective view of a main part of a lens barrel according to Embodiment 2 of the present invention when viewed from a front side.
Figure 8:
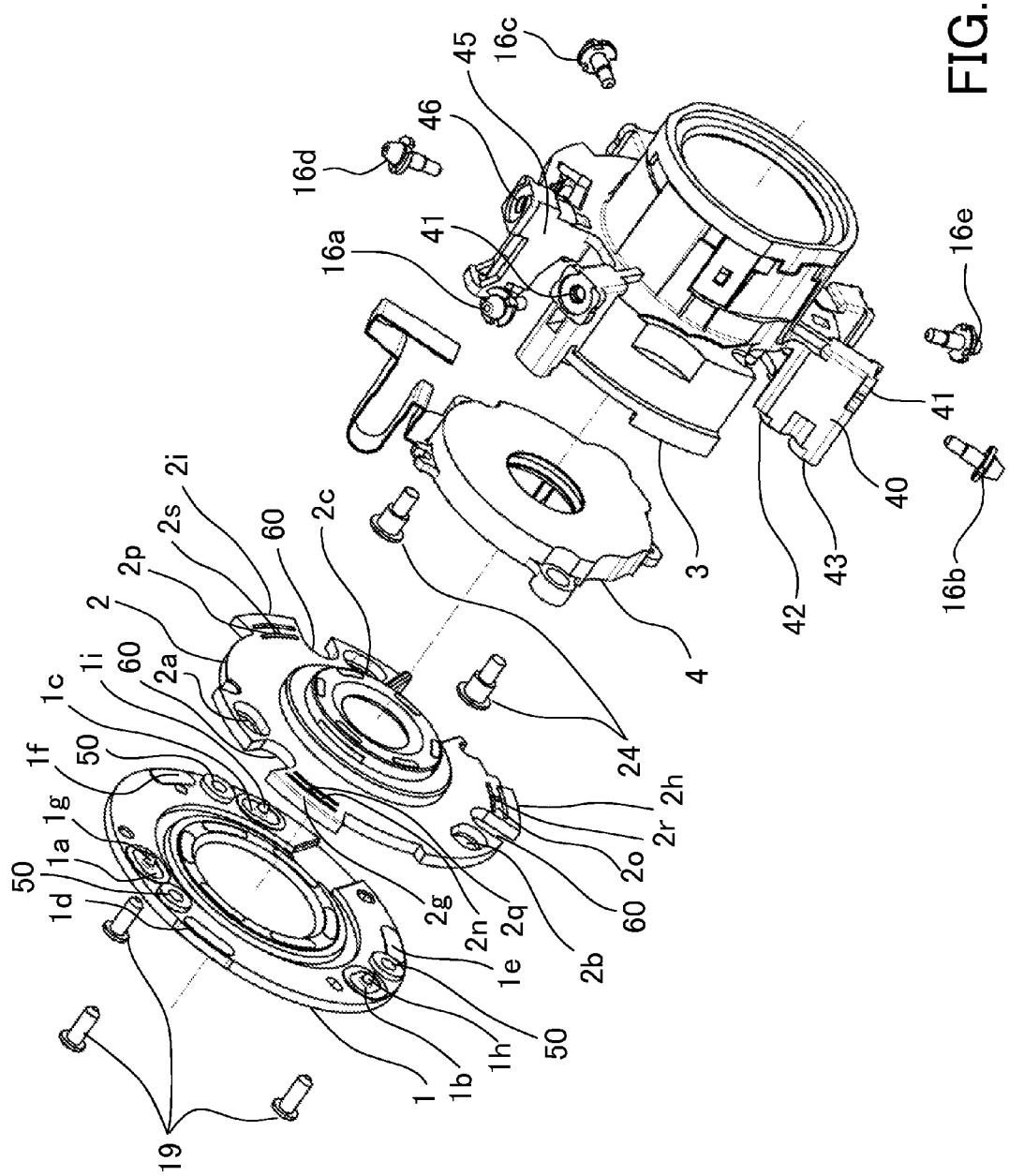
FIG. 8 is an exploded perspective view of the main part of the lens barrel illustrated in FIG. 7 when viewed from a back side according to Embodiment 2.

Next follows a description of Embodiment 2 with reference to FIGS. 7 and 8. The same components as those in Embodiment 1 are denoted by the same reference numerals as those in Embodiment 1, and a detailed description thereof will be omitted. Embodiment 2 differs from Embodiment 1 in that the elastically deformers, which are provided to the third lens holder 3 in Embodiment 1, are provided to the second lens holder 2. Embodiment 2 is equivalent to Embodiment 1 in that the second lens holder 2 is held between the first lens holder 1 and the third lens holder 3 movably in the direction orthogonal to the optical axis, and bonded after the optical centering.

FIG. 7 is a partially exploded perspective view of a lens barrel according to Embodiment 2 when viewed from the front side (object side). FIG. 8 is a partially exploded perspective view of the lens barrel when viewed from the back side (image side).

The second lens holder 2 is provided with outer and inner holes, and includes three integrated, elastically deformers 2n, 2o, and 2p each including an elastic member extending in the circumferential direction and deformable in the optical-axis direction. This integral formation contributes to reductions in the number of components and cost. The elastically deformers 2n, 2o, and 2p are provided with hemispherical protrusions 2q, 2r, and 2s for contact with the third lens holder 3.

The third lens holder 3 is provided with contact portions 3j, 3k, and 3l for contact with the second lens holder 2 at three points, and the contact portions 3j, 3k, and 3l are made contact with the hemispherical protrusions 2q, 2r, and 2s of the elastically deformers 2n, 2o, and 2p.

The elastically deformers 2n, 2o, and 2p of the second lens holder 2 elasticity deform when made contact with the contact portions 3j, 3k, and 3l of the third lens holder 3 in the assembled state. Thus, the second lens holder 2 is constantly pressed in the optical-axis direction toward the first lens holder 1 by reaction forces applied by the elastically deformers, and is held movable in the direction orthogonal to the optical axis. These reaction forces can prevent the pre-bonded second lens holder 2 from moving, shifting or falling off from a predetermined position, and can prevent its unsteadiness between the first lens holder 1 and the third lens holder 3.

Similarly to the configuration illustrated in FIG. 5, in Embodiment 2, the tool contact portions 2g, 2h, and 2i and the elastically deformers 2n, 2o, and 2p are provided substantially in the same angle phases. The elastically deformers 2n, 2o, and 2p press vicinities where the tool pins 30a, 30b, and 30c apply forces, which prevents the second lens holder 2 from moving by the forces applied by the tool pins 30a, 30b, and 30c. The adhesive agent filling holes 2a, 2b, and 2c and the adhesive agent receivers 1a, 1b, and 1c are provided in angle phases different from those of the tool contact portions 2g, 2h, and 2i and the elastically deformers 2n, 2o, and 2p. This configuration allows the adhesive agent to be filled into the adhesive agent filling parts while the adjusted state by the tool pins 30a, 30b, and 30c is maintained.

The motor 4a is disposed in an angle phase different from that of each of the adhesive agent filling holes 2a, 2b, and 2c, the adhesive agent receivers 1a, 1b, and 1c, the tool contact portions 2g, 2h, and 2i, and the elastically deformers 2n, 2o, and 2p. If the motor 4a is disposed in the same angle phase as that of each of the elastically deformers and the adhesive agent filling parts, it is necessary to dispose the elastically deformers and the adhesive agent filling parts outside the motor 4a, which leads to an increase in size. Disposing the motor 4a in the angle phase different from that of each of the elastically deformers and the adhesive agent filling holes improves space efficiency to avoid the increase in size.

The diaphragm unit 4 has the outline 4b inside the inscribed circle 2m of the adhesive agent filling holes 2a, 2b, and 2c. Specifically, the adhesive agent filling holes are provided at positions to avoid interference with the tool contact portions 2g, 2h, and 2i, and the motor 4a and the outline 4b of the diaphragm unit 4, when viewed from the back side. This allows the adhesive agent to be applied from the back side to fix the second lens holder 2 after the centering of the second lens holder 2 disposed at a sandwiched position in the assembled state.

The centering is performed in a similar manner to that in Embodiment 1. The tool contact portions 2g, 2h, and 2i are provided in substantially the same angle phases as those the elastically deformers 2n, 2o, and 2p of the second lens holder 2, and disposed near the elastically deformers 2n, 2o, and 2p. In this manner, the second lens holder 2 is prevented from moving in the position adjustment using the tool pins 30a, 30b, and 30c, and an improved accuracy of the centering is achieved.

Similarly to Embodiment 1, this embodiment can provide tool pins with a simple configuration.

Since the adhesive agent is filled from the back side into the adhesive agent filling parts including the adhesive agent filling holes and the adhesive agent receivers at three points and then cured, the second lens holder 2 can be reliably fixed to the first lens holder 1. After the adhesive agent is cured, the tool pins are removed. The second lens holder 2 is fixed by bonding after the tool pins are removed, and its adjusted state is maintained even when an external force etc. is applied. After the centering and the adhesive agent curing, the elastically deformers 2n, 2o, and 2p still constantly press the second lens holder 2 toward the first lens holder 1. Thus, even when receiving, for example, a strong impact enough to strip the adhesive agent, the second lens holder 2 is prevented from moving.

When this pressed state is changed between the adjustment and the bonding, an adjustment position may shift and lead to an optical performance degradation. This problem does not happen with this embodiment because a force is constantly applied to the second lens holder 2 from the centering until the adhesive agent curing.

Embodiment 3

Figure 9:
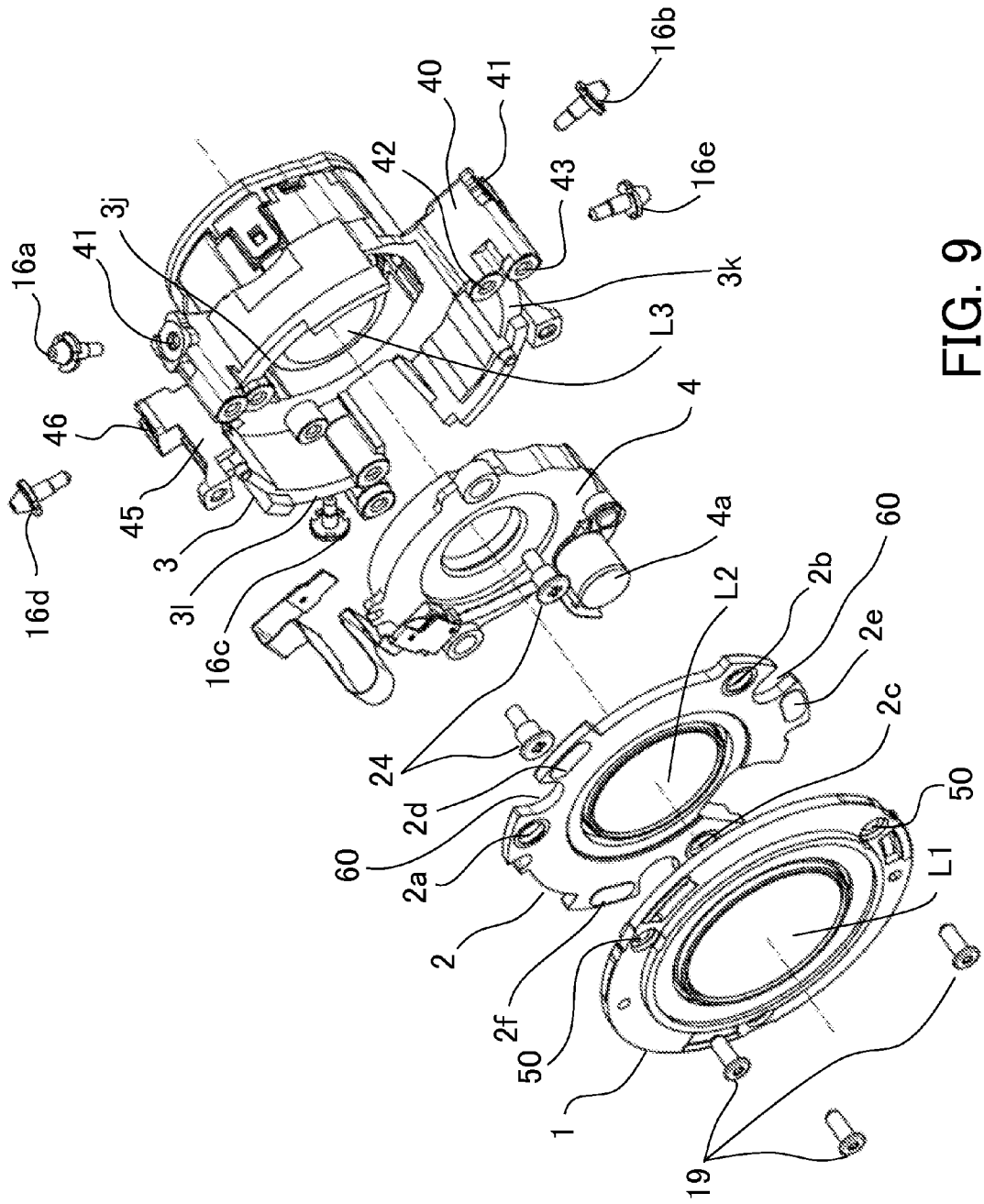
FIG. 9 is an explored perspective view of a main part of a lens barrel according to Embodiment 3 of the present invention when viewed from a front side.
Figure 10:
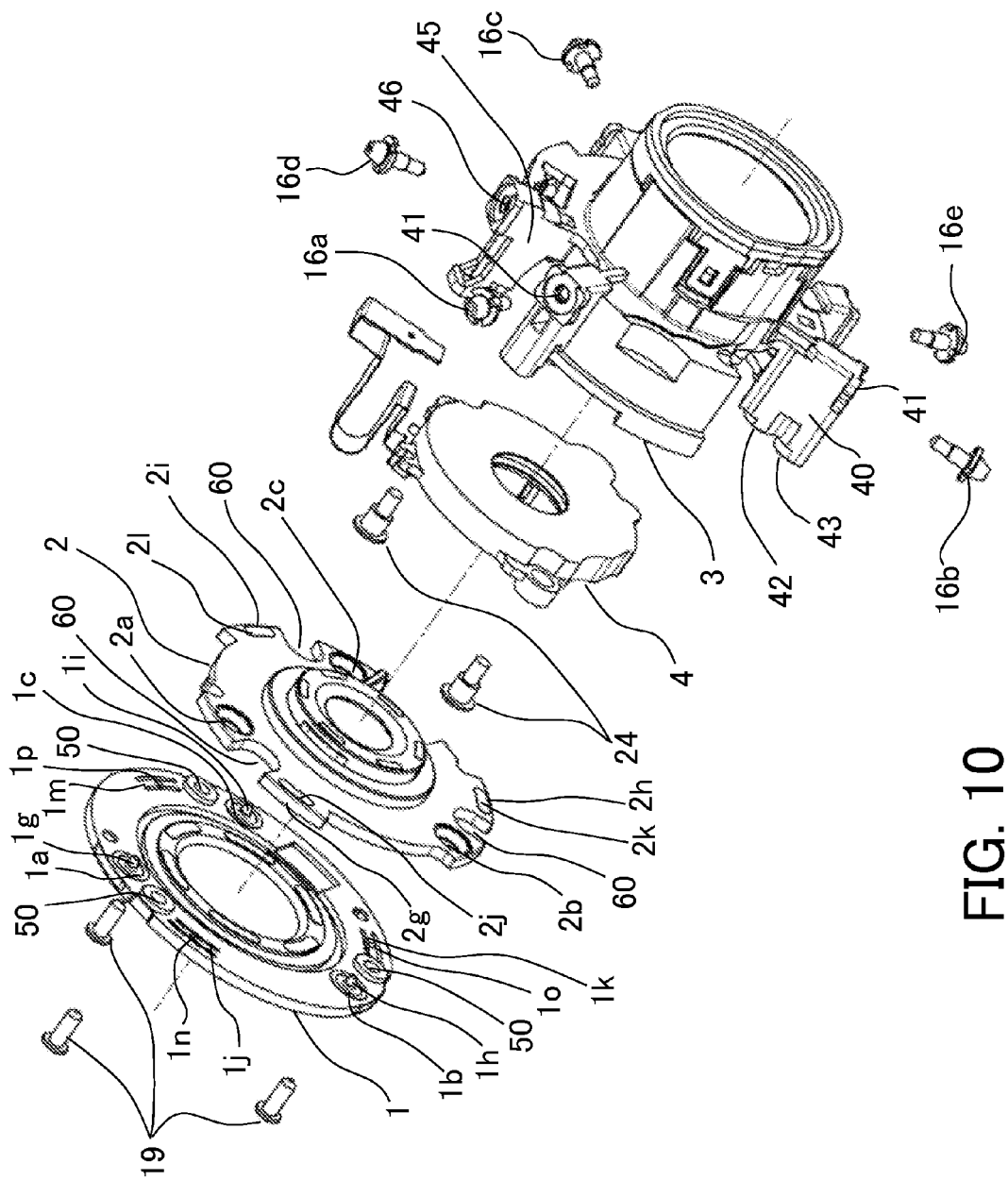
FIG. 10 is an explored perspective view of the main part of the lens barrel illustrated in FIG. 9 when viewed from a back side according to Embodiment 3.

Next follows a description of Embodiment 3 with reference to FIGS. 9 and 10. The same components as those in Embodiments 1 and 2 are denoted by the same reference numerals as those in Embodiments 1 and 2, a detailed description thereof will be omitted. Embodiment 3 differs from Embodiments 1 and 2 in that the elastically deformers are provided to the first lens holder 1. Embodiment 3 is equivalent to Embodiment 1 in that the second lens holder 2 is held between the first lens holder 1 and the third lens holder 3 movably in the direction orthogonal to the optical axis, and bonded after the optical centering.

FIG. 9 is a partially exploded perspective view of a lens barrel according to Embodiment 3 when viewed from the front side (object side). FIG. 10 is a partially exploded perspective view of the lens barrel when viewed from the back side (image side).

The first lens holder 1 is provided with outer and inner holes, and includes three integrated, elastically deformers 1j, 1k, and 1m each including an elastic member extending in the circumferential direction and deformable in the optical axis. This integral formation contributes to reductions in the number of components and cost. The elastically deformers 1j, 1k, and 1m are provided with hemispherical protrusions 1n, 1o, and 1p for contact with the second lens holder 2.

The second lens holder 2 is provided with contact portions 2d, 2e, and 2f for contact with the first lens holder 1 at three points, and the contact portions 2d, 2e, and 2f are made contact with the hemispherical protrusions 1n, 1o, and 1p of the elastically deformers 1j, 1k, and 1m.

The elastically deformers 1j, 1k, and 1m of the first lens holder 1 elastically deform when made contact with the contact portions 2d, 2e, and 2f of the second lens holder 2 in the assembled state. Thus, the second lens holder 2 is constantly pressed in the optical axis toward the third lens holder 3 by reaction forces applied by the elastically deformers, and is held movable in the direction orthogonal to the optical axis. These reaction forces can prevent the prebonded second lens holder 2 from moving, shifting or falling off from a predetermined position, and can prevent its unsteadiness between the first lens holder 1 and the third lens holder 3.

The tool contact portions 2g, 2h, and 2i and the elastically deformers 1j, 1k, and 1m are provided substantially in the same angle phases. The adhesive agent filling holes 2a, 2b, and 2c and the adhesive agent receivers 1a, 1b, and 1c are provided in angle phases different from those of the tool contact portions 2g, 2h, and 2i and the elastically deformers 1j, 1k, and 1m.

The motor 4a is disposed in an angle phase different from that of each of the adhesive agent filling holes 2a, 2b, and 2c, the adhesive agent receivers 1a, 1b, and 1c, the tool contact portions 2g, 2h, and 2i, and the elastically deformers 1j, 1k, and 1m.

The diaphragm unit 4 has the outline 4b inside the inscribed circle 2m of the adhesive agent filling holes 2a, 2b, and 2c. Specifically, the adhesive agent filling holes are provided at positions to avoid interference with the tool contact portions 2g, 2h, and 2i, and the motor 4a and the outline 4b of the diaphragm unit 4, when viewed from the back side.

This configuration provides the same advantages as those obtained in Embodiments 1 and 2. The centering is performed in a manner as in Embodiments 1 and 2.

Since the adhesive agent is filled from the back side into the adhesive agent filling parts including the adhesive agent filling holes and the adhesive agent receivers at three points and then cured, the second lens holder 2 can be reliably fixed to the first lens holder 1. After the adhesive agent is cured, the tool pins are removed. The second lens holder 2 is fixed by bonding after the tool pins are removed, and its adjusted state is maintained even when an external force etc. is applied. After the centering and the adhesive agent curing, the elastically deformers 1j, 1k, and 1m still constantly press the second lens holder 2 toward the third lens holder 3. Thus, even when receiving, for example, a strong impact enough to strip the adhesive agent, the second lens holder 2 is prevented from moving.

When this pressed state is changed between the adjustment and the bonding, an adjustment position may shift and lead to an optical performance degradation. This problem does not happen with this embodiment because a force is constantly applied to the second lens holder 2 from the centering until the adhesive agent curing.

Other Embodiments

The adhesive agent filling holes may be provided in the third lens holder 3, and the adhesive agent receivers may be provided to the second lens holder 2. Moreover, when the centering is performed while the lens barrel is placed with the first lens unit L1 located at the top, the adhesive agent filling holes may be provided to the first lens holder 1, and the adhesive agent receivers may be provided in the second lens holder 2, or the adhesive agent filling holes may be provided in the second lens holder 2, and the adhesive agent receivers may be provided to the third lens holder 3.

The embodiments above each describe the lens barrel detachably attached to the camera body (holding device), but the present invention is applicable to optical apparatuses including image capturing apparatuses such as a lens integrated camera, a video camera, and a surveillance camera, an observation apparatus such as a binocular, and an image projection apparatus such as a liquid crystal projector. In other words, the present invention is applicable to an optical apparatus that includes the lens barrel and a holding unit configured to hold the lens barrel. The holding unit refers to, for example, the camera body, a projector body of the liquid crystal projector except for a projection lens, and a binocular body of the binocular except for a lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-174798, filed on Aug. 29, 2014, which is hereby incorporated by reference herein in its entirety.

What is claimed is:

1. A lens barrel comprising:
a first barrel component;
a second barrel component configured to hold a first lens unit;
a third barrel component configured to hold a second lens unit that is different from the first lens unit; and
an elastic member integrally formed on the second barrel component or the third barrel component and deformable to apply an elastic force onto the second barrel component in an optical-axis direction of the second lens unit,
wherein the first barrel component, the second barrel component, and the third barrel component are disposed so that at least part of the first barrel component, at least part of the second barrel component, and at least part of the third barrel component are overlapped with one another when the lens barrel is viewed from the optical-axis direction, and
wherein the second barrel component is arranged between the first barrel component and the third barrel component and bonded to one of the first barrel component or the third barrel component, and a position of the second barrel component is adjustable in a direction orthogonal to the optical-axis direction before the second barrel component is bonded.

2. The lens barrel according to claim 1, wherein the second barrel component has a through-hole extending along a direction parallel to the optical-axis direction and to which adhesive agent is applied, and the one of the first barrel component or the third barrel component includes a receiver configured to receive the adhesive agent applied to the through-hole.

3. The lens barrel according to claim 2, further comprising a diaphragm unit configured to adjust a light quantity, wherein when the second barrel component and the diaphragm unit are projected onto a plane orthogonal to the optical-axis direction, the diaphragm unit is provided inside a circle that has a radius as a line segment from the optical-axis direction to part of the through-hole closest to the optical axis and a center at the optical-axis direction.

4. The lens barrel according to claim 2, wherein when the second barrel component is projected onto a plane orthogonal to the optical-axis direction, the through-hole and the receiver configured to receive the adhesive agent are provided outside an angle range around the optical-axis direction as a center, of a contact portion of the second barrel component, at which the second barrel component contacts with a tool.

5. The lens barrel according to claim 3, wherein when the second barrel component is projected onto a plane orthogonal to the optical-axis direction, an actuator of the diaphragm unit is disposed not overlapping with the through-hole.

6. The lens barrel according to claim 3, wherein when the second barrel component is projected onto a plane orthogonal to the optical-axis direction, an actuator of the diaphragm unit is disposed not overlapping with a tool contact portion of the second barrel component.

7. The lens barrel according to claim 1, further comprising a fixer configured to fix the first barrel component and the third barrel component to each other so that the position of the second barrel component is adjustable in the direction orthogonal to the optical-axis direction and the elastic force by the elastic member is applied to the second barrel component.

8. The lens barrel according to claim 1, wherein the first barrel component configured to hold a third lens unit.

9. The lens barrel according to claim 1, wherein when the second barrel component is projected onto a plane orthogonal to the optical-axis direction, the elastic member applies the elastic force in an angle range around the optical-axis direction as a center, of a contact portion of the second barrel component, at which the second barrel component contacts a tool.

10. An optical apparatus comprising:
a lens barrel; and
a body configured to hold the lens barrel;
wherein the lens barrel comprises:
- a first barrel component;
- a second barrel component configured to hold a first lens unit;
- a third barrel component configured to hold a second lens unit that is different from the first lens unit; and
- an elastic member integrally formed on the second barrel component or the third barrel component and deformable to apply an elastic force onto the second barrel component in an optical-axis direction of the second lens unit,
- wherein the first barrel component, the second barrel component, and the third barrel component are disposed so that at least part of the first barrel component, at least part of the second barrel component, and at least part of the third barrel component are overlapped with one another when the lens barrel is viewed from the optical-axis direction, and
- wherein the second barrel component is arranged between the first barrel component and the third barrel component and bonded to one of the first barrel component or the third barrel component, and a position of the second barrel component is adjustable in a direction orthogonal to the optical-axis direction before the second barrel component is bonded.

11. A method of manufacturing a lens barrel comprising a first barrel component, a second barrel component configured to hold a first lens unit, a third barrel component configured to hold a second lens unit that is different from the first lens unit, and an elastic member integrally formed on the second barrel component or the third barrel component and deformable to apply an elastic force onto the second barrel component in an optical-axis direction of the second lens unit, wherein the first barrel component, the second barrel component, and the third barrel component are disposed so that at least part of the first barrel component, at least part of the second barrel component, and at least part of the third barrel component are overlapped with one another when the lens barrel is viewed from the optical-axis direction, the method comprising the steps of:
- fixing the first barrel component and the third barrel component to each other with the second barrel component held between the first and third barrel components so that a position of the second barrel component is adjustable in a direction orthogonal to the optical-axis direction and the elastic force applied by the elastic member is applied to the second barrel component;
- adjusting the position of the second barrel component in the direction orthogonal to the optical-axis direction through a tool while the tool is in contact with the second barrel component; and
- bonding the second barrel component to one of the first barrel component or the third barrel component.

12. The method of manufacturing a lens barrel according to claim 11, wherein when the second barrel component is projected onto a plane orthogonal to the optical-axis direction, the elastic member applies the elastic force in an angle range around the optical-axis direction as a center, of a contact portion of the second barrel component, at which the second barrel component contacts a tool.

13. The method of manufacturing a lens barrel according to claim 11, wherein:
- the second barrel component has a through-hole extending along a direction parallel to the optical-axis direction and to which an adhesive agent is applied, and the one of the first barrel component or the third barrel component has a receiver configured to receive the adhesive agent applied to the through-hole;
- the through-hole is provided outside an angle range around the optical-axis direction as a center, of a contact portion of the second barrel component, at which the second barrel component contacts the tool, when the second barrel component is projected onto a plane orthogonal to the optical-axis direction; and
- the bonding step is performed while the tool is in contact with the second barrel component.

14. The method of manufacturing a lens barrel according to claim 13, wherein:
- the lens barrel comprises an actuator for driving a diaphragm configured to adjust a light quantity;
- the actuator is provided outside an angle range around the optical-axis direction as a center, of the through-hole when the second barrel component is projected onto a plane orthogonal to the optical-axis direction; and
- the bonding step is performed while the actuator is assembled in the lens barrel.

15. The method of manufacturing a lens barrel according to claim 11, wherein:
- the lens barrel comprises an actuator for driving a diaphragm configured to adjust a light quantity;
- the actuator is provided outside an angle range around the optical-axis direction as a center, of a contact portion of the second barrel component, at which the second barrel component contacts the tool, when the second barrel component is projected onto a plane orthogonal to the optical-axis direction; and
- the adjusting step is performed while the actuator is assembled in the lens barrel.

* * * * *